Feb. 13, 1923.

L. E. E. VIENOT.
SHELL SPECTACLE FRAME.
FILED MAY 19, 1922.

1,445,249.

INVENTOR.
LÉON EDOUARD ERNEST VIENOT
BY
Stockbridge & Borst
ATTORNEY.

Patented Feb. 13, 1923.

1,445,249

UNITED STATES PATENT OFFICE.

LÉON EDOUARD ERNEST VIÉNOT, OF PARIS, FRANCE, ASSIGNOR TO E. B. MEYROWITZ, INC., A CORPORATION OF NEW YORK.

SHELL SPECTACLE FRAME.

Application filed May 19, 1922. Serial No. 562,055.

*To all whom it may concern:*

Be it known that I, LÉON EDOUARD ERNEST VIÉNOT, a citizen of the French Republic, residing at Paris, France, have invented certain new and useful Improvements in Shell Spectacle Frames, of which the following is a full, clear, and exact description.

In the construction of shell spectacle frames, it is usual to connect the two bows or temples to lugs at the sides of the lens-enclosing rims by means of hinges which are secured to the lugs and to the temples by rivets or screws passing through these parts. Stops are also provided for limiting the outward movements of the bows or temples on the hinges. In applying spectacles of this type it is necessary to spring the bows outwardly at their free ends beyond the limits permitted by the stops in order that the bows may pass freely along the sides of the face to a position back of the ears. Considerable strain is thus brought upon the bows at their hinged ends and breakage at these points is quite common. This breakage is due largely to the fact that the ends of the bows are weakened by the passage of the hinge-attaching rivets or screws through them. To avoid this objection, it has been customary to make the bows very wide and thick at their hinged ends. But this produces a bulky, awkward construction which is itself objectionable and it does not wholly overcome the tendency to breakage.

My invention is designed for the production of an improved construction of spectacle frame which will permit of the use of slender, delicate, graceful bows, and in which danger of breakage of the bows at the hinged ends thereof is reduced to a minimum. The use of rivets or screws which receive the strain brought about by the outward springing of the bows and weaken the latter, is dispensed with, and straps or bands on the hinges for receiving such outward strain and reinforcing the bows, are substituted therefor.

The details of the invention will hereinafter appear and that which I regard as new will be set forth in claims.

In the drawing forming part of the specification—

Like reference numerals indicate like parts in the different views.

Figure 1:
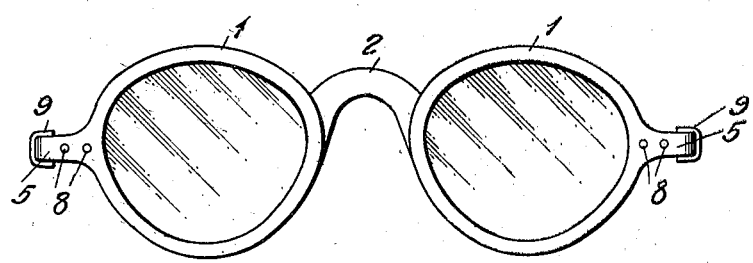
Figure 1 is a plan view of a shell spectacle frame embodying my invention.
Figure 2:
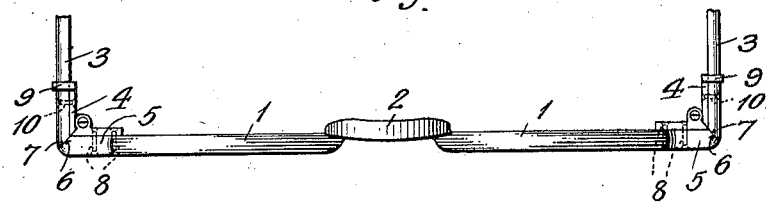
Figure 2 is an edge view of the same.
Figure 3:
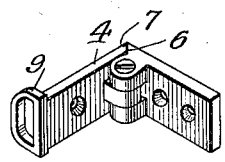
Figure 3 is a detail view of one of the hinges.

My improved spectacle frame comprises lens-enclosing rims 1, with a bridge 2 connecting the same, bows or temples 3 and the hinges 4. The rims, bridge and bows are preferably made of tortoise shell or similar material and the bridge has been shown as integral with the rims. Each of the rims 1 has an outwardly extending lug 5 thereon provided with an inclined or beveled end 6, and each of the bows 3 is provided with a similar inclined or beveled end 7. The beveled ends 6 and 7 contact with each other when the bows are moved to positions substantially at right angles to the rims 1 and act as stops for limiting the outward movements of the temples. Each of the lugs 5 has one leaf of a hinge 4 secured to it, preferably by means of rivets 8. The other leaf of each spring is secured to one of the bows or temples 3. In order to reinforce the bows and overcome the tendency they have to break when the same are sprung outwardly against the resistance offered by the stops 6 and 7, the outer leaf of each hinge is provided with a strap or band 9 which encircles and tightly grips one of the bows. When the bows are sprung outwardly the strain thereon is taken by the straps 9 on the hinges instead of by rivets or screws passing through the bows, as in the old form of construction. The result is that the tendency to breakage at the hinges is greatly reduced if not entirely overcome and the bows or temples may be made very delicate and slender at the ends which are attached to the hinges. Rivets 10, one for each hinge, may be employed in addition to the straps or bands 9, but it will be noted that none of the lateral strain upon the bows or temples is taken by these rivets. They merely serve to prevent the bows from being removed from the hinges by a longitudinal movement.

Each of the bows 3 at its hinged end is slightly tapered and is of a shape in cross section corresponding with the passage through the strap or band. To apply a bow to a hinge, the tapered end of the former is inserted into the strap of the hinge and forced downwardly therein until it is tightly embraced by the strap. The rivet 10 may then be applied to hold the parts in place. Afterwards the bow may be trimmed off to form the beveled end 7.

Having now described my invention, what I claim is:

1. A spectacle frame comprising a pair of lens-enclosing rims, a bridge connecting the same, a pair of bows and hinges for uniting the bows to the rims, one of the leaves of each hinge having a strap thereon which completely surrounds and grips one of the bows.

2. A shell spectacle frame comprising a pair of lens-enclosing rims having outwardly extending lugs thereon, a bridge connecting said rims, a pair of bows and hinges for uniting the bows to said lugs, each of the hinges having one of its leaves provided with a continuous strap or band which embraces and tightly engages one of the bows.

In witness whereof, I hereunto subscribe my signature.

VIÉNOT, LÉON EDOUARD ERNEST.